United States Patent [19]

Bake

[11] 4,390,282
[45] Jun. 28, 1983

[54] CONTAINER

[76] Inventor: Willem J. H. Bake, c/o R. A. Marriner, Aries Corp., 1225 Hodges Rd., Lake Charles, La. 70601

[21] Appl. No.: 180,104

[22] Filed: Aug. 21, 1980

Related U.S. Application Data

[60] Continuation-in-part of Ser. No. 2,089, Jan. 9, 1979, abandoned, which is a division of Ser. No. 3,612, Jan. 15, 1979, Pat. No. 4,189,237, which is a continuation of Ser. No. 758,795, Jan. 12, 1977, abandoned.

[30] Foreign Application Priority Data

Jul. 6, 1976 [NL] Netherlands ............ 7607466

[51] Int. Cl.³ .............. B01F 15/02; B28C 7/04
[52] U.S. Cl. .................... 366/40; 141/100; 141/242; 222/129; 222/162; 298/8 H; 298/29; 366/41; 366/181
[58] Field of Search ......... 366/2, 8, 9, 16–19, 366/21, 32, 33, 37, 41, 150, 177, 180, 181, 40; 222/129, 162, 558; 141/242, 100, 9; 298/8 H, 29, 30

[56] References Cited

U.S. PATENT DOCUMENTS

| 836,190 | 11/1906 | Judd | 222/129 |
|---|---|---|---|
| 2,299,702 | 10/1942 | Mosel | 222/129 |
| 2,300,753 | 11/1942 | Wagner et al. | 222/129 |
| 3,064,832 | 11/1962 | Heltzel | 366/19 |
| 3,343,725 | 9/1967 | Cannon | 222/129 |
| 3,617,031 | 11/1971 | Paris | 366/41 |
| 4,191,101 | 3/1980 | Ogawa et al. | 141/100 |

Primary Examiner—Philip R. Coe
Assistant Examiner—Timothy F. Simone
Attorney, Agent, or Firm—Diller, Ramik & Wight

[57] ABSTRACT

Containers for providing predetermined quantities of cement and aggregate to be transported to a site for on site mixing of concrete. The containers have two compartments which are self closing due to the weight of the contents, one compartment containing cement and the other aggregate. When placed on a ring-like support the compartments release their contents. The hopper of the concrete mixer provides support to permit the opening of the container mouths and has a water spray curtain to prevent the fine cement powder to be taken away by the wind, with the water spray providing the correct amount of water for the concrete.

7 Claims, 15 Drawing Figures

FIG. 1
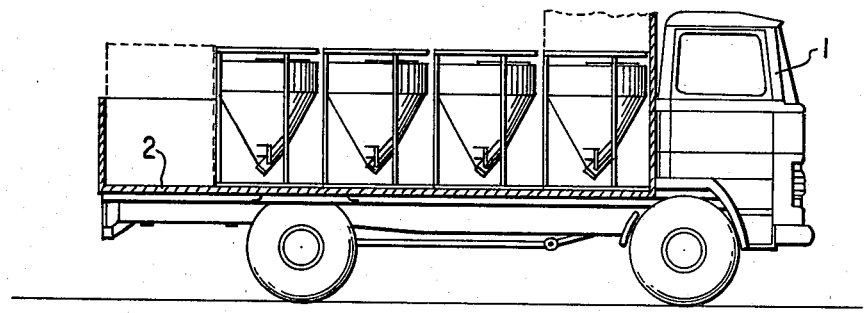
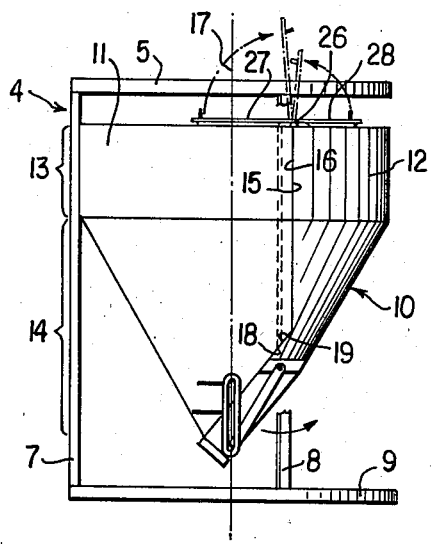
FIG. 2
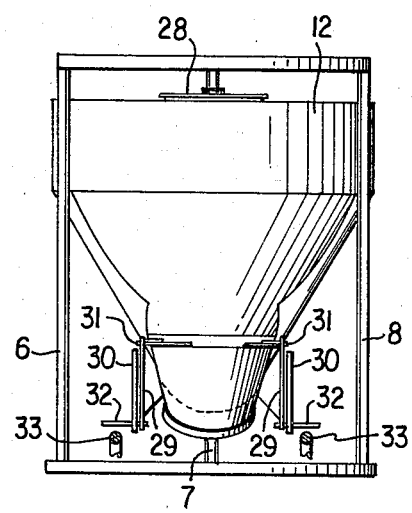
FIG. 3
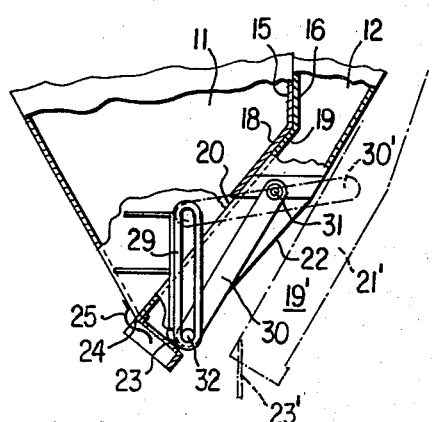
FIG. 5
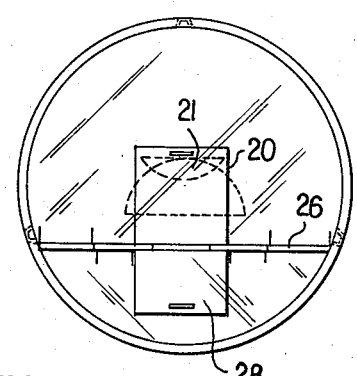
FIG. 4

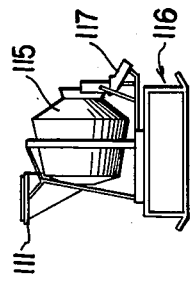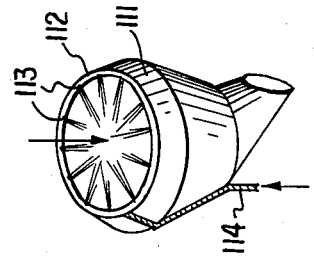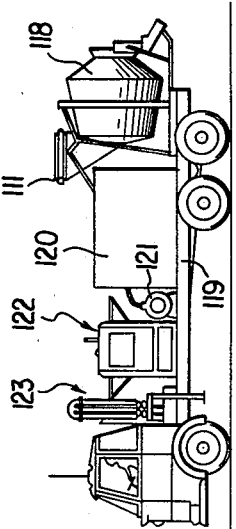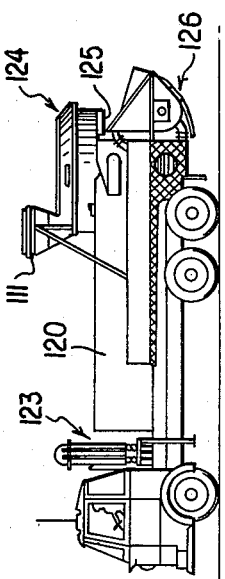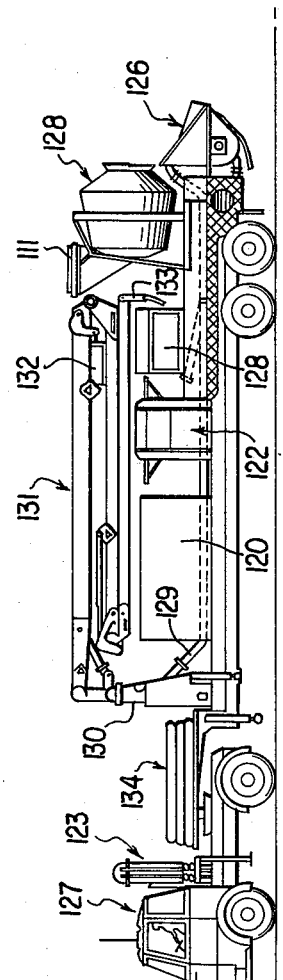
FIG. 9
FIG. 13
FIG. 10
FIG. 11
FIG. 12

CONTAINER

CROSS REFERENCE TO RELATED APPLICATIONS

This application is a Continuation-in-Part of copending application Ser. No. 2089, filed Jan. 9, 1979, abandoned in favor of this application, which is a division of application Ser. No. 3612, filed Jan. 15, 1979, now U.S. Pat. No. 4,189,237, and which application is a continuation of application Ser. No. 758,795, filed Jan. 12, 1977 and now abandoned.

BACKGROUND OF THE INVENTION

The invention relates to containers for use with a method of preparing concrete in which the quantities of cement and aggregate are measured and stored separately in one or more containers at a central supply station where the solid raw materials are present, said containers are then brought to the site, where the whole contents of the container or containers and the quantity of water required for the specific quantities of solids are deposited in a concrete mixer, the solids and the water are mixed to the required degree in the mixer, and the ready-mixed concrete is used immediately on the site. This enables freshly mixed concrete to be used at any time, such concrete being mixed according to requirements. Deliveries of the appropriate measured quantities of solids in containers are not restricted to the same timetable as the use of concrete on the building site. The containers may be delivered at any suitable time during the working day. The raw materials can always be kept ready, so that there is never any need to wait. Simple containers and standard trucks to transport these containers can be used. Conventional concrete mixers can be used to mix the concrete. The space required on the site for the purposes of supplying the raw materials and preparing the concrete can be very limited. Another important advantage is that the process of measuring out the quantities of cement and aggregate into the containers at the supply station is independent of requirements at any given time at each of the building sites supplied from this supply station.

The quantities of cement, aggregate and water can be so determined that the concrete has a specific quality. Consequently, it is possible to satisfy the highest standards as regards concrete quality at the site. An advantage is that the quantities of cement can be kept lower than otherwise required to achieve a given quality because only freshly prepared concrete is used.

The measured quantities of cement and aggregate can be placed in the natural state in separate compartments of a container. The advantage of this is that with a specific container the required quantities of cement and aggregate are immediately available so that the use of a specified number of containers enables a given volume of concrete to be mixed in the required quality.

A stock of measured quantities of cement and aggregate can be kept in a number of containers, such stock being greater than the immediate requirements on the site where the concrete is mixed and poured. This results in very flexible operation and the concrete requirements can immediately be met without affecting operations at the preparation station. The cement and aggregate should be always accurately measured in practice so that the addition of a predetermined volume of water will given concrete mixes of maximum uniformity. It is more efficient to locate an accurate automatic, semi-automatic, or non-automatic weighing installation and maintain it at the central supply station than to temporarily install and maintain such equipment on a building site.

BRIEF SUMMARY OF THE INVENTION

According to one embodiment, the container can consist of two complementary parts which each form a compartment and which can be movably connected and which can abut one another by a wall or part of a wall, each of said complementary parts having its own inlet and outlet aperture, the outlet apertures can be closed by flaps or slides, the outlet flap or slide of one compartment forming part of, or being connected to, a wall of the other compartment, and the two compartments can be so connected that on a relative movement of the compartments with respect to one another the outlets are opened. A container of this kind facilitates the use of the method, particularly since both the raw materials required are available in the required quantities when the container is transported and the two compartments are automatically emptied by moving the two compartments of the container relatively to one another.

The complementary parts of the container can be mounted in a frame and under the influence of the deadweight the relatively movable parts can remain in a relative position with respect to one another in which the outlet apertures are closed. This eliminates any problems in connection with keeping the container parts closed. Once they have been filled they automatically remain closed.

The frame in which the complementary parts of the container are mounted can be so constructed that it can be stacked on a corresponding frame of another container. The advantage of this is that a large number of containers can be transported on a truck very easily.

One part of a container can have one or more vertical guides in which a member provided with stops can move, said member being connected to the other part of the container, in such manner that when the frame together with the container is placed on a suitable support the steps abut a check edge so that under the influence of the deadweight of the filled container the compartments perform a relative movement with respect to one another to open the outlet. The particular advantage of this is that when the container is placed on a suitable support, e.g. above a concrete mixer, the compartments automatically empty into the concrete mixer.

The relatively movable compartments can taper, at least near the bottom end, the compartments can be pivotally connected near the adjacent top edges, and the steps movable in the vertical guides can be connected to the free end of an arm pivotally fixed to the other compartment. As a result, the compartments readily move apart about the pivot at the top when they are disposed on the appropriate support.

The arm can be fixed to the spindle of a rotatable flap which closes the outlet of the other compartment. As a result, the pivoting flap opens automatically under the influence of the pivoting arm.

At least one of the compartments can have an aperture which can be closed by a wall part of the other compartment resting against it in the filled state. Another possibility is a wall part closing an aperture in the other wall part in combination with a pivoting flap to open the other outlet aperture, or there may be two apertures in the wall parts which are closed by the other wall parts.

In another embodiment of the container, the complementary compartments together can have a cylindrical part and an adjoining conical part therebeneath, the common wall part can extend upwardly parallel to the axis of the cylindrical and cone and at some distance from said axis, adjacent the common wall part there can be a bottom wall part which forms an angle with the axis of the cone and the cylinder and intersects said axis, in such manner that said bottom wall part forms the bottom boundary of the largest compartment, the outlet aperture of said compartment in said bottom wall part being situated near the bottom edge and the outlet aperture of the smallest compartment can be formed by the conical segment cut off by the bottom wall part of said compartment. This gives a container divided into compartments having approximately the required relative sizes and with which very easy emptying is possible.

In an advantageous embodiment of the above-described container, the conical segment can be closed at the bottom by a pivoting flap pressed into the closed position by a sprung stop on the largest compartment. As soon as the compartments move away from one another, the stop releases the pivoting flap so that it can open.

The conical segment can have an extra taper near the bottom end so that the outer describing line is parallel to the bottom common wall part.

According to another feature of the invention, the relatively movable compartments can abut by a vertical flat wall and one compartment can have an aperture in said wall near the bottom, said aperture being closable by the wall of the other compartment, the other compartment being closed at the bottom by an inclined plate forming part of the one compartment, and both compartments can taper near the bottom. The compartments may move in various ways with respect to one another, still giving good sealing of the outlet apertures in the closed condition.

In another embodiment of the container according to the invention, the compartments can move vertically with respect to one another, one compartment being coupled to the other via pivoting pull rods, which are pivotally secured by one end to one compartment and at the other end to a crank pivotally secured to the other compartment, one or more cranks resting against a stop just past a dead-center position in the closed position of the compartments under the influence of the tension in the pull rods, in such a manner that when one compartment is lifted somewhat the cranks swing back through the dead-center position and the one compartment slides downwards along the other.

In another embodiment, the container can have compartments which are concentric about the central vertical axis of the container, one compartment completely surrounding another, said compartments having their lower ends open to allow outlet of material and there being a closure part which moves relative to the compartment to open and close the lower ends thereof.

In a specific embodiment, the container can have an exterior cylindrical part and an adjoining conical part therebeneath, the compartments within the container can have a common wall as defined by another cylindrical part spaced concentrically within said exterior part. Aligned vertically along the axis of the container there can be a tubular guide through which an axle bar may slide. The axle bar can carry, on its lower end, a closure part which shuts off the open lower ends of the compartments and the axle bar's upper end can extend centrally through cylindrical parts in such a manner that the container and its contents can be suspended from above by the upper end of the axle bar or supported from below on the closure part so as to maintain the compartments in a closed condition under transport or transfer in either case. When the container is placed on a suitable support which engages the outer surface of the conical part beneath the exterior cylindrical part, the axle bar and closure part are permitted to move downwardly thus opening the lower ends of the compartments to discharge the contents therein.

It can be remarked that the problem in using the invention could be that the very fine cement powder could be taken away by the wind during emptying of the containers. This could cause a heavy pollution of the environment. A water curtain gives an effective protection against this kind of pollution. The water curtain is provided by the top ring of the hopper leading to the cement mixer, which ring abuts part of the container lowered onto the hopper and releases the contents of the container into the hopper. When the container is placed on the hopper and the contents of the container are discharged into the hopper, the water curtain is created from the supply of water to be added to the contents to form the concrete mix.

BRIEF DESCRIPTION OF THE DRAWING FIGURES

The invention will be explained hereinafter with reference to a number of exemplified embodiments and the drawing wherein:

FIG. 1 shows a truck or lorry with a number of container according to the invention;

FIG. 2 is a side elevation of a container according to the invention;

FIG. 3 is an end view of the container shown in FIG. 2;

FIG. 4 is a top plan view of the container shown in FIGS. 2 and 3;

FIG. 5 is a detail of FIG. 2 in an enlarged scale;

FIG. 9 is a device for use with the invention;

FIG. 10 is a truck for use with the invention;

FIG. 11 is a truck for use with the invention in another embodiment of the invention;

FIG. 12 is a trailer for use with the invention;

FIG. 13 is a receiving hopper of a concrete mixer for use with the invention.

DETAILED DESCRIPTION OF THE INVENTION

Figure 6:
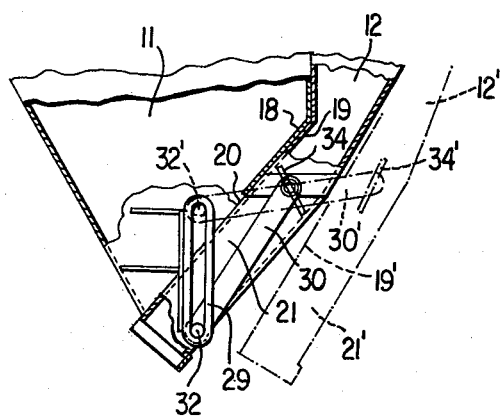
FIG. 6 is a detail of FIG. 5 in another embodiment of the invention.

FIG. 1 shows a normal truck or lorry 1 with a platform 2 on which a number of containers 3 are disposed. For example, two containers are disposed one next to the other, while a second layer can be stacked thereon. Each container 3 is disposed in a frame 4. The frames are so constructed that they can readily be stacked. A frame 4 consists of a top ring 5 borne by a bottom ring 9 through the agency of vertical posts 6, 7 and 8.

A container 10 is fixed to the posts 6, 7 and 8 and consists of two complementary parts 11 and 12. The latter form separate compartments. The container 10 of the unit consists of a cylindrical top part 13 with an adjoining conical part 14. The compartments 11 and 12 abut the walls 15 and 16 respectively. The top part of the walls 15 and 16 is parallel to, and at some distance from, the axis 17 of the cylindrical part 13 and the conical part 14 of the container. A bottom part 18 and 19 adjoins the wall parts 15 and 16 and is at an angle to the axis 17, and intersects the latter. Compartment 11 consequently tapers downwardly near the bottom end. The wall part 18 is formed with an aperture 20 near the bottom end. Aperture 20 in the position illustrated is closed by the adjoining wall part 19. At the bottom, compartment 12 has an outlet duct formed mainly by a conical segment cut off from the conical part 14 by the wall part 19. The outer wall of part 21 is bevelled somewhat more sharply and the outer describing line of this part extends approximately parallel to the wall part 19. Near the free bottom end the part 21 has a pivotable flap 23 which closes the part 21 and which can turn about the pivot axis 24. In the position shown in FIG. 5, the flap 23 is pressed in the closed position by a leaf spring 25 fixed to the compartment 11. Near the top end of the walls 15 and 16 the compartments 11 and 12 are pivotally connected via a pivot 26. Two lids 27 and 28 can pivot about the pivot 26 as well. The lids 27 and 28 close two filling apertures of the compartments 11 and 12. As will be apparent from the various Figures, and particularly FIG. 5, two vertical guides 29 are disposed on the outside of the compartment 11. One arm 30 is pivotally fixed by one end at 31 on compartment 12. The other end of arm 30 has a projecting part 32 mounted in the guide 29. Part 32 extends outwardly to past the guide 29 as will be clear from FIG. 3. The system now operates as follows.

A container 10 fixed in the frame is filled with measured quantities of raw materials at a supply station for the solid raw material for the preparation of concrete, via the filling apertures closed by the lids 27 and 28. For example, sand and gravel are introduced into the compartment 11, while the cement is stored in compartment 12. In the position illustrated, the outlet apertures of the compartments 11 and 12 are closed and the container remains closed at the bottom under the influence of the weight of the filling of the compartment 12. The wall part 19 presses with force against the wall part 18 so that the aperture 20 is closed and the spring 25 presses the flap 23 into sealing-tight relationship under the influence of the same force. When the compartments 11 and 12 are filled with the correct measured quantities of solid raw materials such that the admixture of a given quantity of water to these quantities results in a concrete of the required quality, the filling apertures are closed by means of the lids 27 and 28 and, for example, a crane is used to place the container 10 in the filled state on a truck or lorry 1. When the latter is completely loaded, it is driven to the building site where the raw materials are required for the preparation of concrete. A crane, for example, is used at the building site to take from the truck a frame 4 with a container 10 and bring it above a concrete mixer (not shown). A ring 33 may be provided above the concrete mixer, as may also a support for the frame base ring 9. The base ring 9 drops around the ring 33 and the diameter of the latter ring is so selected that before the ring 9 comes to rest on the said support the projecting parts 32 are pressed upwardly by the ring 33 so that the projecting parts 32 slide in the guide 29. This takes place under the deadweight of the contents of the compartment 11. When the projecting parts 32 slide upwardly in the guide 29, the arm 30 presses the compartment 12 outwardly via the pivot point 31, compartment 12 pivoting about axis 26 with respect to compartment 11. FIG. 5 shows in broken-lines how this movement takes place. Arm 30 reaches position 30' and outlet part 21 of compartment 12 comes into position 21'. Wall 19, which closes the aperture 20 in the wall part 18, comes into the position 19'. This aperture 20 is thus released and the contents of the compartment 11 drop down into the concrete mixer. The leaf spring 25 also released pivoting flap 23, which comes into position 32' under the influence of the filling in the compartment 12, so that the contents of the compartment 21 also arrive in the concrete mixer. Depending upon the predetermined moisture content of the sand and gravel, the required quantity of water is then added in a manner now shown in detail, it being possible to use the optimum quantities to give the highest quality of concrete. After the raw materials have been sufficiently mixed in the concrete mixer, the concrete can immediately be poured. Consequently, there is no need to keep large quantities of material in stock at the building site, and consequently little space is required. Care must be taken to ensure that sufficient containers 10 are present to enable work to continue uninterruptedly. When work commences, a check can also be made to ensure that there are sufficient containers ready. Mixing and pouring of the concrete can then start immediately.

FIG. 6 shows a somewhat different construction of the container. The cross-section in FIG. 6 corresponds to that shown in FIG. 5 and like parts have like references. The difference in the construction is that the flap 23 and leaf spring 25 are not provided in FIG. 6. The outlet 21 of compartment 12 is in this case closed by means of the pivoting flap 34, which is fixed to the pivot for arm 30. When arm 30 pivots on the opening of the container and the pivot 31 rotates together with the pivoting arm 30, the flap 34 secured to the pivot 31 will also turn and reach position 34', the outlet of compartment 12 being opened as will be clear from FIG. 6. Otherwise the system operates in exactly the same way as described with reference to FIGS. 1 to 5.

Figure 7:
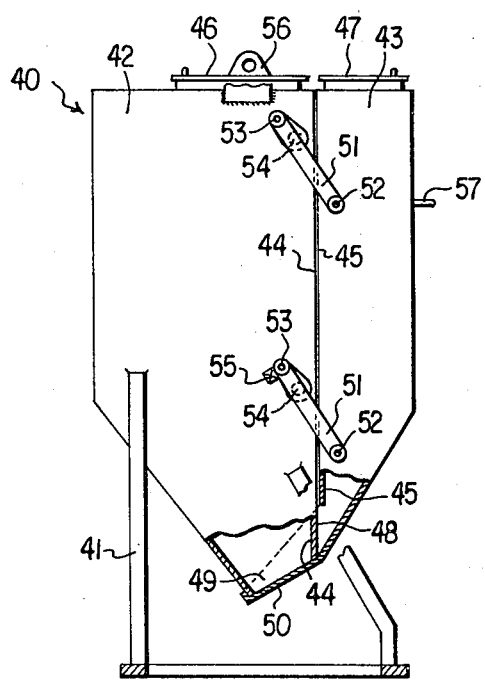
FIG. 7 is a side elevation of yet another embodiment of a container according to the invention.

FIG. 7 shows another embodiment of a container according to the invention. The container 40 shown is disposed in a frame 41, which may have a rectangular cross-section and consists of compartments 42 and 43. Compartments 42 and 43 are situated with the vertical walls 44 and 45 adjoining one another. The compartments taper at the bottom. At the top, the compartment 42 is provided with a filling aperture closed by a pivoting lid 46, while compartment 43 has a filling aperture which can be closed by a pivoting lid 47. Compartment 43 has an outlet aperture 48. This aperture, which is situated in wall 45, is closed, in the position illustrated, by the wall 44 abutting the wall 45. At the bottom, compartment 42 has an outlet aperture 49. In the position illustrated, this aperture is closed by a plate-like member 50 rigidly connected to the compartment 43. The compartments 42 and 43 could be connected at the top by a pivot in the manner described, in which case the parts would pivot apart and the apertures 48 and 49 would be freed. However, FIG. 7 shows a different embodiment, in which the compartments 42 and 43 can slide vertically with respect to one another and there is therefore no pivoting movement. Compartment 43 is suspended by pull rods 51 from compartment 42. The pull rods 51 are pivotally secured to the compartment 43 at 52, at one end, while at the other end they are secured to a crank 53. The latter can rotate about a shaft or spindle 54 fixed on compartment 42. In the position illustrated, one of the cranks 53 abuts a fixed stop 55. The crank is then just turned through the dead-center position with respect to the tension exerted by the rod 51. Under the influence of the deadweight of the filled compartment 43, the compartments 42 and 43 remain in the illustrated position with respect to one another. Compartment 42 is also provided with a lifting eye 56, while compartment 43 is provided with a handle 57 which can also be constructed as a lifting eye or as a stop.

When the container 40 is placed above a concrete mixer, care must be taken to ensure that compartment 43 is first moved upwards somewhat with respect to the compartment 42. This can be done manually, for example, by means of the handle 57 or a lifting system or a removable stop, against which part 57 abuts when the container 40 is lowered. When the compartment 43 moves upwards slightly, crank 53 turns through the dead-center position and under the influence of the weight of the compartment, the crank 53 swings to the right so that the compartment 43 sinks vertically downwards along the compartment 42. In these conditions, the outlet apertures 48 and 49 are freed in the manner described hereinbefore. Here again, therefore, automatic simultaneous emptying is obtained of both compartments 42 and 43 after the container 40 has been lowered on top of the concrete mixer.

Figure 8:
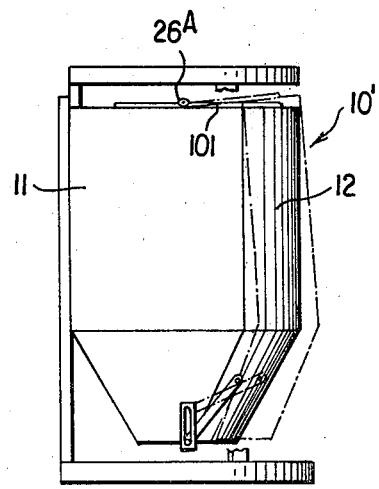
FIG. 8 is a side elevation of a container in another embodiment of the invention.

In the embodiment of FIG. 8 the only essential difference with the embodiment according to the FIGS. 2 and 3 is that the axis of rotation 26a is displaced to the middle of the container 10'. The compartment 12 is connected with axis 26a by means of two supports 101 which e.g. are welded to the upper side of the compartment 12. The free ends of these supports 101 are connected to the axis 26a. It will be clear that the two compartments 11 and 12 are pressed against each other under the influence of the weight of the filled compartments with a larger force than in the case of the container according to the FIGS. 2 and 3.

Figure 15:
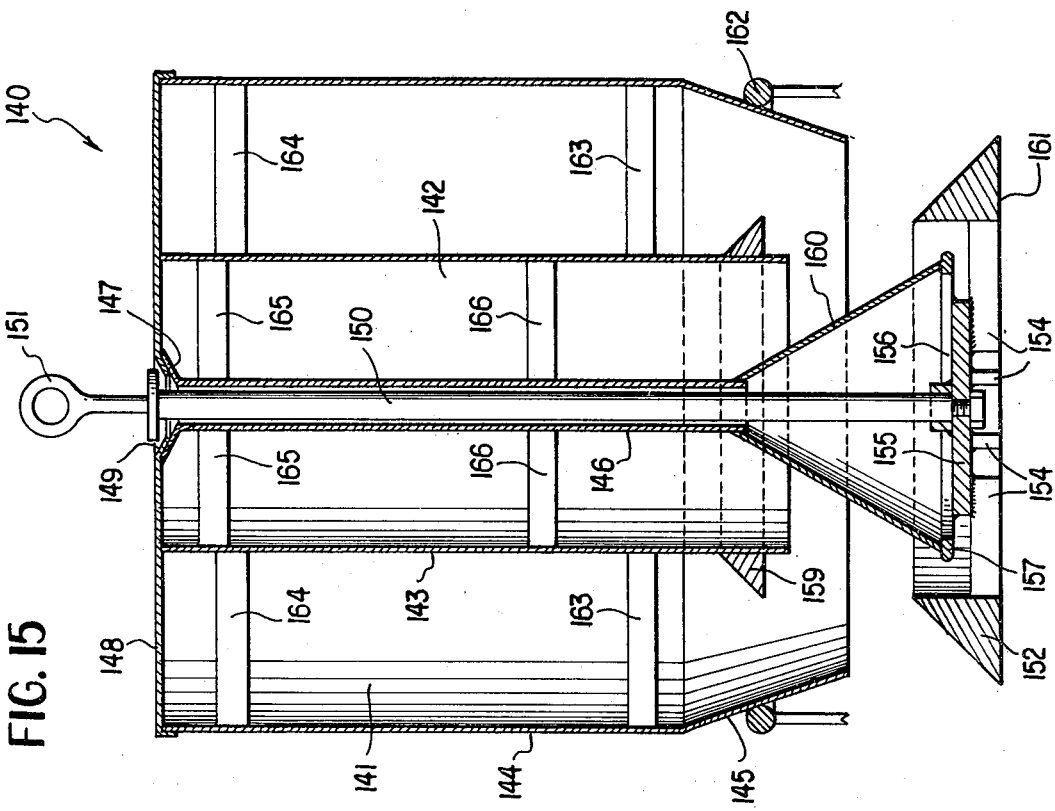
FIGS. 14 and 15 illustrate a side elevation of yet another embodiment of a container.
Figure 14:
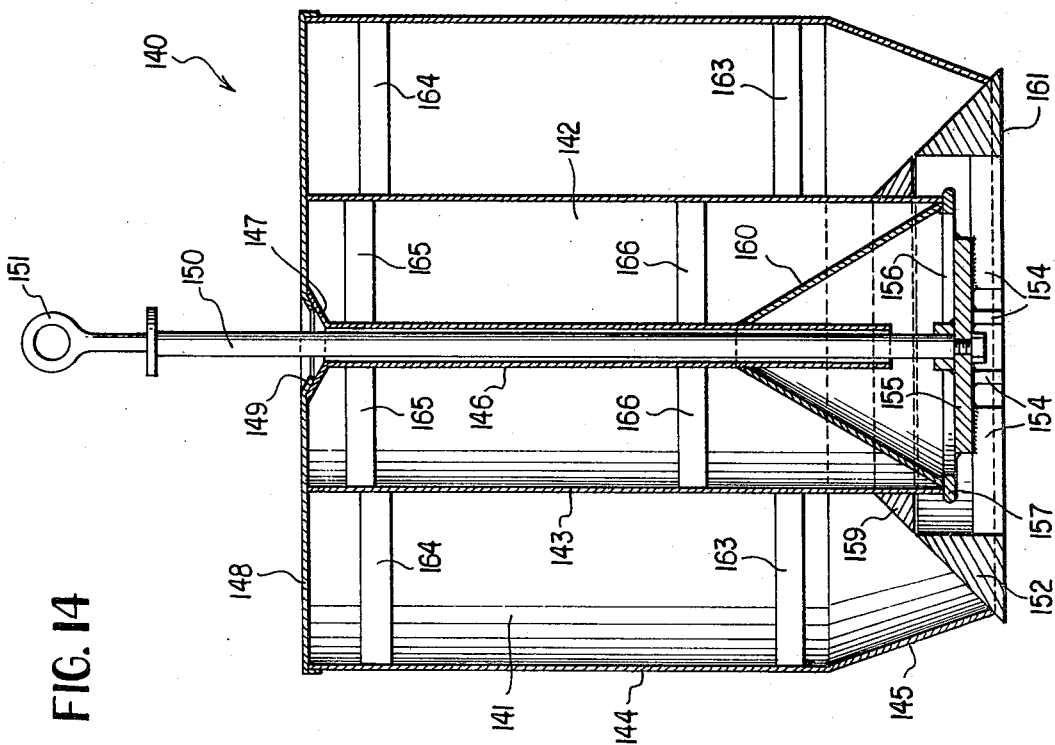

The container assembly illustrated in FIGS. 14 and 15 represents a further embodiment which operates basically on the same principle as those previously described. The container assembly which is indicated generally by the reference character 140 provides the two separate compartments 141 and 142, the compartment 141 being of generally annular form and defined between the tubular wall member 143 and the outer wall which comprises the cylindrical wall portion 144 surmounting the frusto-conical wall portion 145, which latter part as will hereinafter be described, provides and forms the support means which is adapted to seat upon a receptacle assembly while aligning the discharge mouths of the two compartments 141 and 142 with the receptacle and serving to permit the support means for suspending the container assembly to allow the opening of such discharge mouths.

The other compartment 142 is defined between the central tubular member 146 and the aforementioned cylindrical wall 143 and, as will be seen, the upper end of this tubular member 146 is outwardly flared in funnel fashion as indicated at 147 for a purpose which will hereinafter be described. Thus, the upper portions of the walls 143 and 144 define an annular inlet mouth for the compartment 141 whereas the upper perimeter of the portion 147 and the upper end of the wall 143 define an inlet mouth or opening for the compartment 142, substantially as is shown. A removable cover assembly 148 may be utilized in conjunction with the container assembly shown in FIGS. 14 and 15 and, when in place, the downturned flange 149 at its central opening nests within the funnel portion 147 so that precipitation may drain off downwardly through the inner tube 146. On the other hand, the lower perimeter of the wall 143 forms the discharge mouth for the compartment 142 whereas the annular opening between the lower perimeter of the wall 143 and the lowermost edge of the portion 145 defines the annular discharge mouth for the compartment 141.

The support means for suspending the container assembly 140 comprises a vertical rod 150 passing through the inner tubular member 146 and which is provided with a suitable hook receptacle or the like 151 at its upper end. The lower end of the rod 150 is rigidly attached to and forms part of the mechanism for closing off the discharge mouths of the compartments 141 and 142. This mechanism comprises the ring member 152 having an upwardly facing conical surface 153 and provided with inwardly directed radial arms 154 welded or otherwise fixedly secured to the circular plate 155 which, in turn, is welded or otherwise suitably fixed to the radial arms 156 which are joined to or form part of the sealing ring member 157. The wall 143 is provided, adjacent its lower end, with the skirt 158 which presents an upwardly facing conical surface 159 which effectively provides a continuation of the surface 153 when the discharge mouths are effectively closed. At the same time, the lower edge or perimeter of the wall 143 seats upon the essentially flat upper surface of the sealing ring 157, the frusto conical closure/baffle 160 being secured at its base to the ring 157 inwardly of the wall 143 and presenting an upper opening which relatively snuggly but slidably receives the tubular member 146. Thus, when the container assembly is either supported on the flat surface 161 or is suspended by suitable mechanism engaging the eye 151, the parts are in the position illustrated in FIG. 14 so as to close off the discharge mouths of the compartments 141 and 142. However, when the base portion 145 of the container assembly is seated upon a suitable supporting ring 162 associated with a mixer or like receptacle so that the discharge mouths of the compartments 141 and 142 are aligned with the inlet of such receptacle, the parts will assume the position shown in FIG. 15, the three tubular elements 146, 143 and 144 being rigidly interconnected by means of the several sets of radial arms 163, 164, 165 and 166.

FIG. 13 shows the receiving hopper of the concrete mixer used when applying the method according to the invention. The upper edge 112 of the hopper 111 corresponds e.g. with the ring 33 in FIG. 3. The upper edge has in FIG. 13 the form of e.g. a ring 112 which is provided with nozzles 113. These nozzles are directed inwardly and give a kind of water curtain. The water is supplied to the ring 112 by means of the duct 114. The duct 114 can be connected with the means for adding water to the contents of the mixer. When the container is placed on the hopper 111 and the contents of the container 10 are discharged into the hopper 111 at the same time the water curtain 115 is created by supplying the water through the duct 14. By means of this water curtain it is prevented that powdered cement will be taken away by the wind, so that no pollution can occur.

In the embodiment of FIG. 9, the hopper 111 discharges into a cement mixer 115 mounted on a sledge 116 and having a discharge spout 117 for discharging the cement when mixed.

In the embodiment of FIG. 10, the cement mixer 118 with hopper 111 is mounted on the rear of the truck chassis 119. The truck also carries the water supply tank 120 and motor driven pump 121 for pumping water from the supply to the ring of nozzles 113 of the hopper 111. The generator 122 supplies electricity to drive the accessories such as the motor for the pump 12', etc. The chassis also carries the hydraulic crane 123 to stabilize the truck.

In the embodiment of FIG. 11, the cement mixer 124 with hopper 111 has a discharge spout 125 delivering the mixed concrete to the concrete pump assembly 126.

In the embodiment of FIG. 12, the tractor 127 with fifth wheel hauls a trailer mounting the concrete mixer 128 with hopper 111. As in FIG. 11, the mixer discharges mixed concrete to the concrete pump 126 and has a discharge pipe 129 leading to the mast 130 of the boom assembly 131. The boom is shown folded in FIG. 12 but can be unfolded by the hydraulic cylinders such as 132 to position the discharge head 133 when desired to deliver the mixed concrete. The mast and boom have concrete pipes to deliver the concrete to the head 133. The trailer carries auxiliary hoses 134 for connection to the pump 126 to deliver mixed concrete when desired. Also the trailer carries the hydroelectric control system 128.

What is claimed is:

1. A self-discharging container comprising, in combination:
    a plurality of container portions movably associated with each other for relative movement between a contents-containing closed position and a contents-discharging open position; and
    auxiliary support means operatively associated with said container portions for automatically effecting said relative movement to said contents-discharging position in response to at least partial support of said container weight by said auxiliary support means.

2. A self-discharging container comprising, in combination:
    a frame defining a supporting stand;
    a plurality of container portions suspended from said supporting stand and means connecting said container portions for relative movement to a contents-containing closed position under the suspended weight of said container portions and the contents thereof; and
    auxiliary support means connected with at least one of said container portions for effecting relative movement therebetween to contents-discharging open position in response to at least partial support of the container by said auxiliary support means.

3. A self-discharging container as defined in claim 2 wherein each container portion defines a separate compartment for containing a particular material.

4. A self-discharging container as defined in claim 3 wherein each compartment is of hopper-like form and is provided with a bottom opening, said container portions in the closed position thereof interengaging to close off all of said bottom openings.

5. A portable container for separately storing predetermined quantities of cement and aggregate respectively, said quantities being proportioned so as to form, in mixed association with a predetermined quantity of water, cement of a desired quality, comprising in combination:
    a pair of hopper-like compartments, each having a bottom opening;
    a stand for suspending said compartments and means movably interconnecting said compartments whereby, when suspended, the compartments forcibly come together to close off said bottom openings; and
    bottom support means on at least one of said compartments for effecting relative movement therebetween to uncover said bottom openings in response to placement of at least some of the weight on said bottom support means.

6. A self-discharging container for making concrete, comprising in combination:
    a pair of hopper-like compartments each having a bottom opening, said compartments being shaped such that one compartment is supported by the other to close off said bottom openings;
    a stand suspending said one compartment whereby said compartments normally are in condition in which said bottom openings are closed-off; and
    means for taking at least a portion of the weight of said other compartment to effect relative movement between the compartments and open said bottom openings thereof.

7. A compartmented container assembly adapted separately to store measured quantities of at least two different materials while allowing discharge of such materials in commingled fashion, comprising in combination:
    a container assembly having a plurality of separate compartments for receiving measured amounts of said different materials, each compartment having a bottom discharge mouth, first support means carried by said assembly for suspending said compartments and automatically closing off said discharge mouths thereof, and second support means on said assembly adapted to seat upon an inlet of a receptacle with said discharge mouths in registered position with respect to such inlet for automatically opening said discharge mouths to commingle said different materials while discharging them into the receptacle upon which the assembly is supported.

* * * * *